United States Patent Office 3,506,526
Patented Apr. 14, 1970

1

3,506,526
TRANSPARENT PANEL STRUCTURE HAVING METAL FILAMENTS EMBEDDED THEREIN
Tadao Toyooka, Toyonaka-shi, Japan, assignor to Matsushita Electric Industrial Co., Ltd., Osaka, Japan, a corporation of Japan
Filed Aug. 29, 1966, Ser. No. 575,846
Claims priority, application Japan, Sept. 3, 1965, 40/54,321, 40/54,322, 40/54,323; Sept. 16, 1965, 40/57,580, 40/57,581; Dec. 30, 1965, 41/65
Int. Cl. B44f 1/06
U.S. Cl. 161—5                    17 Claims

ABSTRACT OF THE DISCLOSURE

A transparent panel structure comprising a woven fabric of glass and metal filaments. The structure is formed by wetting the fabric with a liquid material which is reactive with the material into which the fabric is subsequently embedded.

---

Figure 1:
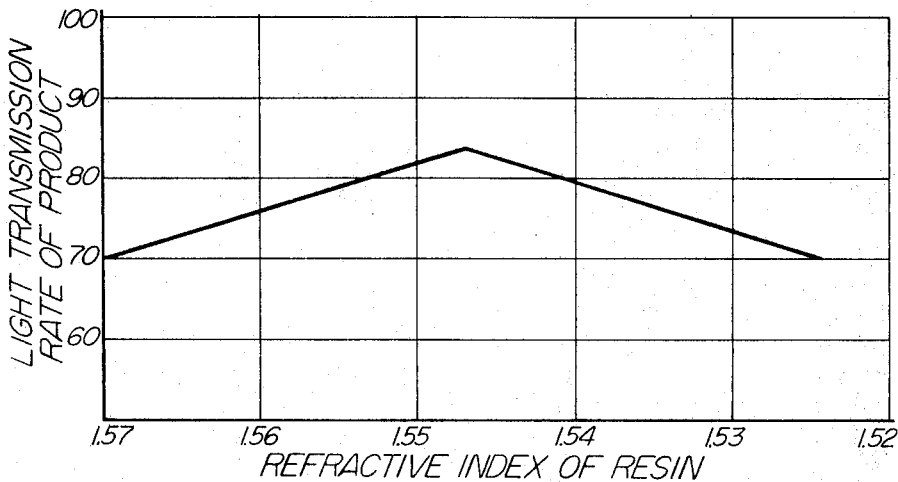

This invention relates to a transparent panel structure having metal filaments embedded therein in equally spaced relation and more particularly to a transparent panel structure of the above-described kind which shows as a whole a high transparency of more than 70% at a wavelength of 600 m$\mu$.

The primary object of the present invention is to provide a transparent panel structure of the above character which is especially suitable for use as front glass of automotive vehicles, show window glass, glass for article display cases, or glass for use in the window of foodstuff warmers. When the transparent panel structure according to the present invention is utilized as front glass of automotive vehicles, show window glass, glass of article display cases, heating elements of toasters or trouser pressers, or the like, current supplied to the embedded metal filaments produces Joule heat in the glass to heat the same, thereby keeping the glass surface from developing of any cloudy spots thereon. When, on the other hand, the transparent panel structure according to the invention is utilized as glass for fitting in the window of foodstuff warmers, current supplied to the embedded metal filaments not only keep cloudy spots from forming on the window, thereby improving the commercial value of the warmer, but also act to keep warm the foodstuffs accommodated in the warmer. The transparent panel structure according to the invention can also be utilized as an electronic fluorescent panel when the metal filaments embedded therein are made to function as electrodes. Further, although such a high transparency as described above may not be necessary, a thermal insulation casing for a battery jar, or a battery jar itself, or separators in the battery jar may be formed from the transparent panel structure of the invention. By so arranging, lowering of electromotive force which is quite marked at low temperature conditions as in winter can be avoided and a constant electromotive force can always be obtained. A marked improvement in the thermal efficiency can be especially attained by forming the separators or the battery jar itself from the transparent panel structure having the metal filaments embedded therein since the electrolyte can be thereby directly heated. Construction of the battery jar from the transparent panel structure is remarkably advantageous because the amount of electrolyte in the battery can be viewed from outside.

According to the present invention, there is provided a transparent panel structure having metal filaments embedded therein characterized in that said transparent panel structure is made by a process comprising bundling glass fibers into yarns, weaving a fabric by use of said yarns as warps and wefts, incorporating metal filaments in substantially equally parallelly spaced relation into said fabric as part of said fabric, wetting said glass fiber fabric with a liquid which permeates easily into the glass fibers and is reactable with a transparent resin material into which said glass fiber fabric is to be embedded in the subsequent step, and embedding said liquid-impregnated glass fiber fabric into a mass of said transparent resin material.

Other objects, advantages and features of the present invention will become apparent as the description further proceeds. In the accompanying drawings, FIG. 1 is a graphic illustration of the relation between refractive index of a transparent resin used in one embodiment of the invention and transparency of the product.

One embodiment according to the invention will now be described in detail hereinunder.

Figure 2:
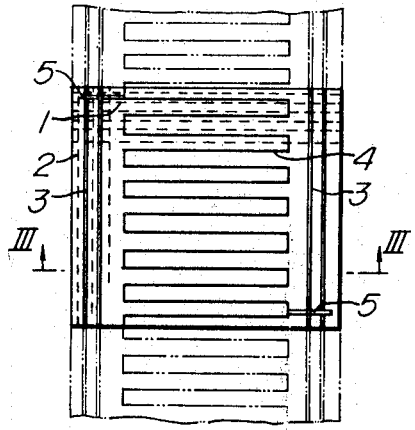
Figure 3:
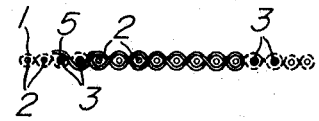

FIG. 1 is a diagram showing the relation between the light transmission rates of the final product of the present invention and of the transparent resin material, FIG. 2 is a plan view of a heat generating element which is an embodiment of the present invention, and FIG. 3 is a sectional view taken at III—III of FIG. 2.

FIGS. 2 and 3 show a heat generating element for use with the transparent panel structure of the present invention. The element takes a form of woven fabric having wefts 1 and warps 2. Lead wires 3 are embedded in the fabric parallel with wefts 1, the lead wires 3 being of such material having same heat expansion coefficient as heat generating wire 4, for example copper. In the central portion of the element a heat generating wire 4 is woven in the fabric together with wefts 1 to form a zigzag configuration. The woven fabric is cut to have a suitable size to obtain a predetermined quantity of heat generated and connecting wires 5 are provided to connect the heat generating wire 4 with the lead wires 3. This will be more precisely explained as follows.

225 filaments of non-alkaline glass fibers having a diameter of 7$\mu$ are bundled by a binder into a yarn and the yarn is given a mean twist of 1.7 turns per length of 2.5 cm. A fabric is woven from these twisted yarns in such a way that 30 warps and wefts lie within a square of 2.5 cm. x 2.5 cm. During this weaving step, metal filaments are woven into the fabric as part of the wefts at equal intervals or at intervals of 5 mm., and the white fabric is then heated for 30 hours at 340° C. to burn away and remove the binder adhering to the glass fibers. After slow cooling styrene monomer is coated on the fabric, which is then embedded into a mass of Polylite 8009 or 8010 (unsaturated polyester resin Polylite 8009 or 8010 made by Dainihon Ink and Chemicals, Inc.). This embedding can be effected in the following manner. Two sheets of tempered glass of required size are prepared at first and a very thin layer of a mold releasing agent such as polyvinyl alcohol is coated on the molding face of the tempered glass. The mold releasing agent should be applied in such a manner as will polish the glass surface and clear the surface of any blurs or stains. A required quantity of Polylite 8009 or 8010 is uniformly coated on one of the glass sheets coated with the mold releasing agent, and then styrene monomer is lightly sprayed by a sprayer onto this resin surface to remove any air bubbles therefrom. In ten minutes or more, the resin starts to solidify into a jellied state. When the resin is turned into the jelly-like state, styrene is coated on the glass fiber fabric having the metal filaments interwoven therein and the fabric is placed in the jellied resin layer. A small quantity of Polylite 8009 or 8010 is then uniformly coated on the exposed face of the glass fiber fabric and styrene is again sprayed onto the resin layer to remove any air bubbles therefrom. The other glass sheet having Polylite 8009 or 8010 coated thereon is then placed on the glass fiber fabric in a manner that the jelly-like resin layer engages the fabric, and a pressure of the order of 1 kg./cm.$^2$ is applied to the assembly until the resin is completely jellied. The assembly is subsequently subjected to a heat of 60° to 80° C. for 10 to 20 minutes to harden the entire resin. After having been completely hardened, the assembly is allowed to cool down to about 40° C. and the tempered glasses on opposite sides are removed to obtain the product.

In the transparent panel structure having the metal filaments embedded therein as described in the above embodiment, the white fabric of glass fibers having the luster peculiar to glass fibers becomes transparent when embedded in the polyester resin, and consequently the metal filaments woven into the glass fiber fabric as part of the wefts thereof are only seen therethrough, with the result that the transparent panel structure has a high light transmission rate with a transparency of 83%. The light transmission rate was measured by use of the Beckmann spectrophotometer and represents the value at a wavelength of 600 m$\mu$.

It will be apparent from the above description that, in the invention, the metal filaments can easily be embedded in parallelly suitably spaced relation in a mass of transparent resin material since the metal filaments can be extremely simply arranged in parallelly suitably spaced relation by merely weaving the filaments into a glass fiber fabric during the weaving step of the latter and since this fabric is embedded in the mass of transparent resin material. Further, in embedding the glass fiber fabric into the mass of transparent resin material, the glass fiber fabric is wetted with styrene monomer, which can easily permeate into the glass fibers of the fabric and is reactable with the transparent resin material, so that the glass fiber fabric when embedded in the transparent resin material becomes transparent with the metal filaments only left opaque. Finally, the transparent panel structure thus obtained has a high degree of transparency.

The transparent panel structure according to the present invention has an especially high degree of transparency owing to the features as described below. The first feature of the invention resides in the fact that the yarn made from glass fibers is given a twist of less than 4 turns per length of 2.5 cm. Though non-twisted yarns are most satisfactory as far as transparency of the product is concerned, such yarns will give weaving difficulties by frequently breaking the yarn and fluffing during the weaving step. It is therefore preferable to give each yarn a mean twist of the order of 1.7 turns.

The second feature of the present invention resides in the fact that warp and weft densities of glass fiber yarns are so selected that 25 to 60 warps and wefts lie in a square of 2.5 cm. x 2.5 cm. Since the transparency is dependent upon the warp and weft densities, lower densities will result in disorder of the structure during the heating step and during handling, and narrow spacing between the metal filaments may result in contact of these metal filaments and will be unbecoming in appearance. Also in the product made from a fabric having low warp and weft densities, difference in transparency between the resin portion and the glass fiber portion becomes quite conspicuous and will be unbecoming in appearance. On the other hand, at higher warp and weft densities, the resin can permeate only with difficulty into the glass fibers and the transparency is thereby reduced.

In the invention, it has been found that presence of 25 to 60 warps and wefts in a square of 2.5 cm. x 2.5 cm. gives a good transparency and is preferable as the product is free from the difficulties as described above.

The following table shows the light transmission rate relative to the number of twists and the number of yarns:

| No. of yarns | Number of twists | | | | | |
|---|---|---|---|---|---|---|
| | 0 | 1 | 2 | 3 | 4 | 5 |
| 25 | 86 | 85 | 84 | 82 | 79 | 75 |
| 30 | 85 | 84 | 83 | 81 | 78 | 74 |
| 35 | 84 | 83 | 82 | 80 | 77 | 73 |
| 40 | 83 | 82 | 81 | 79 | 76 | 72 |
| 45 | 81 | 80 | 79 | 77 | 74 | 70 |
| 50 | 79 | 78 | 77 | 75 | 72 | 68 |
| 55 | 77 | 76 | 75 | 73 | 70 | 66 |
| 60 | 74 | 73 | 72 | 70 | 67 | 63 |

The term "number of twists" in the above table is used to indicate the number of twists per 2.5 cm. length of a composite yarn made by bundling 225 filaments of non-alkaline glass fibers 7$\mu$ in diameter, while the term "number of yarns" represents the number of respective warps and wefts lying in a square of 2.5 cm. x 2.5 cm. in the glass fiber fabric. The light transmission rate which is shown in percent was measured on the transparent panel structures made by the inventive steps from glass fiber fabrics having respective numbers of twists and numbers of yarns and having metal filaments embedded therein, and measurement was taken by the Beckmann spectrophotometer at a wave-length of 600 m$\mu$.

The third feature of the invention resides in the fact that the above-described glass fiber fabric is subjected to heat treatment. More precisely, a binder of farinaceous or like nature is used in the yarn spinning from glass fibers and remains adhered to the surface of glass fibers. This binder must be burnt away by subjecting it to heat because adhesion of the binder on the glass fiber surface results in difficulty of obtaining the desired transparency due to the fact that a change occurs in the refractive index of glass fibers and this refractive index does not match the refractive index of the transparent resin material into which the glass fiber fabric is to be embedded. Adhesion of the binder is also detrimental because the transparent resin material tends to disengage from the glass fiber fabric during use. This heat treatment should be effected at a temperature somewhere between 300° C. and 400° C. since the binder can not be completely removed below 300° C. and the glass fibers would be aged and become brittle when heated to a temperature above 400° C. Therefore heat treatment in a temperature range of from 300° C. to 400° C. is effective to burn away the binder and to obtain the product having a high degree of transparency.

The fourth feature of the invention resides in the fact that the above-described glass fiber fabric is wetted with a liquid such as styrene monomer which can easily permeate into the glass fibers and is reactable with the transparent resin material into which the glass fiber fabric is to be embedded. Application of the above liquid is so effective that this liquid acts to expel any air existing between the glass fibers and reacts with the transparent resin material in the later step of embedding for thereby unifying the assembly and rendering the glass fiber fabric light-transmissive except the portions of metal filaments. This phenomenon is quite similar to a commonly known case in which frosted glass becomes transparent at those portions which are wetted with water. The present invention takes full advantage of such known phenomenon. Any oily matters that may adhere to the glass fiber fabric during handling may result in persistently remaining traces of such matters and degrade the transparency of the product. However, application of the liquid such as styrene monomer to the glass fiber fabric in the invention offers an advantage that any traces of oily matters can thereby be completely eliminated.

The fifth feature of the invention resides in the fact that the transparent resin material used to enclose therein the glass fiber fabric having metal filaments woven or sewn thereinto has a refractive index, at the completion of work, close to the refractive index 1.548 of glass fibers.

For example, Polylite 8009 or 8010 is used as such transparent material. This refractive index can be suitably adjusted by mixing the transparent resin material with a resin having a different refractive index or by adding to the resin material another matter such as monomeric acrylic acid.

Since the refractive index of glass fibers described above shows a decrease of $10^{-7}$ per 1° C. of temperature rise, the refractive index of glass fibers when used for a window glass of a foodstuff warmer operating at a temperature of the order of 70° C. will considerably vary from the refractive index of glass fibers when used as a heat generator designed to develop heat of the order of 200° C. It is therefore necessary that, when the transparent panel structure is intended for use as a window glass for a foodstuff warmer operating at 70° C., the refractive index of glass fibers in the vicinity of 70° C. is first calculated and a resin material having a refractive index close to the calculated value is then selected. Likewise when the transparent panel structure is intended for use as a heat generator for developing heat of 200° C., the refractive index of glass fibers in the vicinity of 200° C. is first calculated and a resin material having a refractive index close to the calculated value is then selected. It will thus be understood that a transparent resin material is always used which has a refractive index close to the refractive index of glass fibers calculated on the basis of the operating temperature of the completed transparent panel structure.

In the present invention, a transparent resin material having a refractive index close to the refractive index of glass fibers is used because the final product shows better transparency when the refractive index of the transparent resin material is as close to that of glass fibers as possible. This fact is apparent from the accompanying drawing, FIG. 1. In FIG. 1, the light transmission rate of the final product obtained by the process as described previously is plotted against variation in the refractive index of transparent resin material while the glass fibers used have a refractive index of 1.548. The light transmission rate was measured by use of the Beckmann spectrophotometer at a wavelength of 600 m$\mu$ and the refractive index was measured by the Abbe refractometer.

A suitable transparent resin material may be selected to suit the particular purpose for which the transparent panel structure having embedded metal filaments is intended to use. For example, when the transparent panel structure is used in an environment exposed to high temperatures or when it is used as a heater with current supplied to the embedded metal filaments, epoxy resins, silicone resins or the like endurable to high temperatures may be selected. Resins suitable for intermediate temperatures include polyesters, polypropylene and the like, while resins suitable for low temperatures include hard polyvinyl chloride, acrylic esters, polycarbonates and the like.

The sixth feature of the invention resides in the fact that an effective bubble-removing treatment can be extremely easily imparted to transparent resin material. More precisely, as described in detail with respect to the embodiment of the invention, a transparent resin material is poured in its liquid form into a mold section when the glass fiber fabric having metal filaments woven or sewn thereinto is embedded in the transparent resin material. In this embedding step, styrene monomer is sprayed onto the surface of transparent resin material to remove any air bubbles entrapped in the resin, and then the glass fiber fabric coated on one of its faces with styrene is placed on the resin surface. A small quantity of the same transparent resin is then uniformly applied to the other face of the glass fiber fabric, and styrene is further coated thereon to remove any air bubbles entrapped in the transparent resin coating. Then the opposite mold section carrying thereon the same transparent resin material turned to a jelly-like state is placed on the glass fiber fabric, and the assembly is subject to heat until the transparent resin is completely hardened. Thereafter, the mold sections are removed to obtain a transparent panel structure which is free of any air bubbles. It will be understood that this bubble-removing treatment is an important factor for improving the transparency of the transparent panel structure according to the present invention. Successful removal of bubbles by application of styrene to the surface of transparent resin material as described above is due to the fact that bubbles entrapped in the resin are burst open by the action of styrene which dissolves the peripheral films of the bubbles. As will be apparent from the foregoing description, this bubble-removing treatment can be completely effected in a short period of time without requiring any special equipment and is thus by far superior over prior practice in which complicated procedures including evacuators and a long period of time have been required for the successful removal of bubbles from a resin composition.

What is claimed is:

1. A transparent panel structure having metal filaments embedded therein characterized in that said transparent panel structure is made by a process comprising bundling glass fibers into yarns, weaving a fabric by use of said yarns as warps and wefts, incorporating metal filaments in substantially equally parallelly spaced relation into said fabric as part of said fabric, wetting said glass fiber fabric with a liquid which permeates easily into the glass fibers and is reactable with a transparent resin material of a differing chemical composition than said wetting liquid into which said glass fiber fabric is to be embedded in the subsequent step, and embedding said liquid-impregnated glass fiber fabric into a mass of said transparent resin material.

2. A transparent panel structure according to claim 1, in which said metal filaments are incorporated as part of said fabric by weaving said metal filaments into said fabric during said step of weaving said fabric from the yarns.

3. A transparent panel structure according to claim 1, in which said metal filaments are incorporated as part of said fabric by sewing said metal filaments into said fabric after said step of weaving said fabric from the yarns.

4. A transparent panel structure according to claim 1, in which said yarns are twisted yarns and a twist of less than 4 turns per length of 2.5 cm. is imparted to the glass fiber bundles to obtain said twisted yarns.

5. A transparent panel structure according to claim 1, in which said yarns are woven to form said fabric in such a manner than 25 to 60 warps and wefts lie in a square of 2.5 cm. x 2.5 cm.

6. A transparent panel structure according to claim 1, in which said transparent resin material has a refractive index same as that of the glass fiber.

7. A transparent panel structure according to claim 1, in which said transparent resin material has a refractive index which is different from that of the glass fiber by less than 0.02.

8. A transparent panel structure according to claim 1, in which, before impregnating said glass fiber fabric with said liquid, said glass fiber fabric is heated to a temperature of 300° to 400° C. to burn away any binder used for the bundling of the glass fibers.

9. A transparent panel structure according to claim 1, in which said transparent resin material has a refractive index which is different by less than 0.02 from that of the glass calculated on the basis of the operating temperature of the completed transparent panel structure.

10. A transparent panel structure according to claim 1, in which said liquid is styrene monomer.

11. A transparent panel structure according to claim 1, in which said transparent resin material is a polyester resin and is used in the form of liquid.

12. A transparent panel structure according to claim 11, in which, before hardening of said liquid polyester resin during molding operation, styrene monomer is applied to the surface of said polyester resin.

13. A transparent panel structure having metal filaments embedded therein characterized in that said transparent panel structure is made by a process comprising bundling glass fibers, imparting to the glass fiber bundles a twist of less than 4 turns per length of 2.5 cm., weaving a fabric by use of the twisted yarns as warps and wefts in such a manner that 25 to 60 warps and wefts lie in a square of 2.5 cm. x 2.5 cm., incorporating metal filaments in substantially equally parallelly spaced relation into said fabric as part of said fabric, heating said glass fiber fabric to a temperature of 300° to 400° C. for burning away any binder adhering to the glass fibers, impregnating said glass fiber fabric with styrene monomer, meanwhile applying a necessary quantity of transparent polyester resin in its liquid form to a mold section treating the resin surface with styrene monomer to remove any air bubbles entrapped in the resin, placing said glass fiber fabric on the resin layer before said resin hardens, applying transparent polyester resin in its liquid form to the surface of said glass fiber fabric, further applying styrene monomer to the resin surface to remove any air bubbles entrapped therein, placing on said glass fiber fabric the opposite mold section having thereon a necessary quantity of transparent polyester resin, and allowing to harden said resin so as to embed said glass fiber fabric in a mass of said transparent polyester resin.

14. A transparent panel structure according to claim 13, in which said metal filaments are incorporated as part of said fabric by weaving said metal filaments into said fabric during said step of weaving said fabric from the twisted yarns.

15. A transparent panel structure according to claim 13, in which said metal filaments are incorporated as part of said fabric by sewing said metal filaments into said fabric after said step of weaving said fabric from the twisted yarns.

16. A transparent panel structure according to claim 13, in which said transparent polyester resin has a refractive index same as that of the glass fiber.

17. A transparent panel structure according to claim 13, in which said transparent polyester resin has a refractive index which is different from that of the glass fiber by less than 0.02.

References Cited

UNITED STATES PATENTS

| | | | |
|---|---|---|---|
| 3,288,735 | 11/1966 | Watanabe et al. | 161—195 X |
| 3,240,619 | 3/1966 | Winchester | 117—62.2 X |
| 3,186,866 | 6/1965 | Claeys | 117—54 X |
| 3,135,625 | 6/1964 | Ingrassia | 117—62.2 |
| 3,085,027 | 4/1963 | Porteous | 117—68 |
| 3,073,004 | 1/1963 | Zeise | 161—91 |
| 2,746,896 | 5/1956 | Thompson | 161—195 X |
| 2,684,305 | 7/1954 | Quinlivan | 117—33 |

ROBERT F. BURNETT, Primary Examiner

M. A. LITMAN, Assistant Examiner

U.S. Cl. X.R.

117—54, 62.2, 126; 161—91, 93, 98, 195; 219—522